United States Patent [19]
Porter

[11] 3,919,548

[45] Nov. 11, 1975

[54] X-RAY ENERGY SPECTROMETER SYSTEM

[76] Inventor: David E. Porter, P.O. Box 4093, Burlingame, Calif. 94010

[22] Filed: July 24, 1974

[21] Appl. No.: 491,300

[52] U.S. Cl. ................ 250/277; 250/520; 250/510
[51] Int. Cl.². G01N 23/20; G21K 1/00; G21K 7/00
[58] Field of Search .......... 250/272, 273, 274, 275, 250/276, 277, 278, 279, 457, 510, 520

[56] References Cited
UNITED STATES PATENTS

| | | | |
|---|---|---|---|
| 2,046,714 | 7/1936 | Wilson et al. | 250/226 |
| 2,995,973 | 8/1961 | Barnes et al. | 250/505 X |
| 3,391,276 | 7/1968 | Delarue | 250/274 |

Primary Examiner—James W. Lawrence
Assistant Examiner—T. N. Grigsby

[57] ABSTRACT

This invention is an improved x-ray energy spectrometer arrangement wherein the quantity and characteristic wavelength of fluorescent x-rays emitted from one or a series of samples are detected upon excitation of such samples either directly with x-rays emitted from the primary target of an x-ray spectroscopy tube or upon excitation of x-rays emitted from one or more of an array of indexible turret-mounted secondary targets of differing compositions.

7 Claims, 7 Drawing Figures

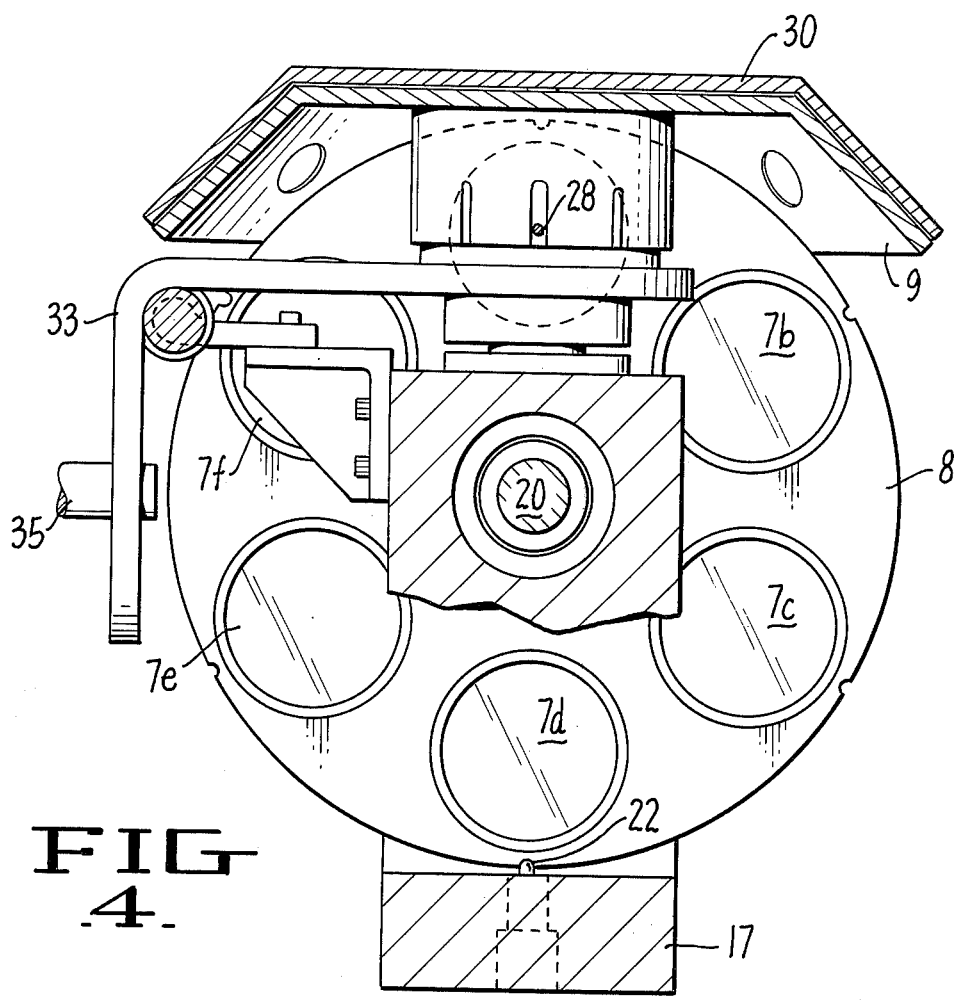
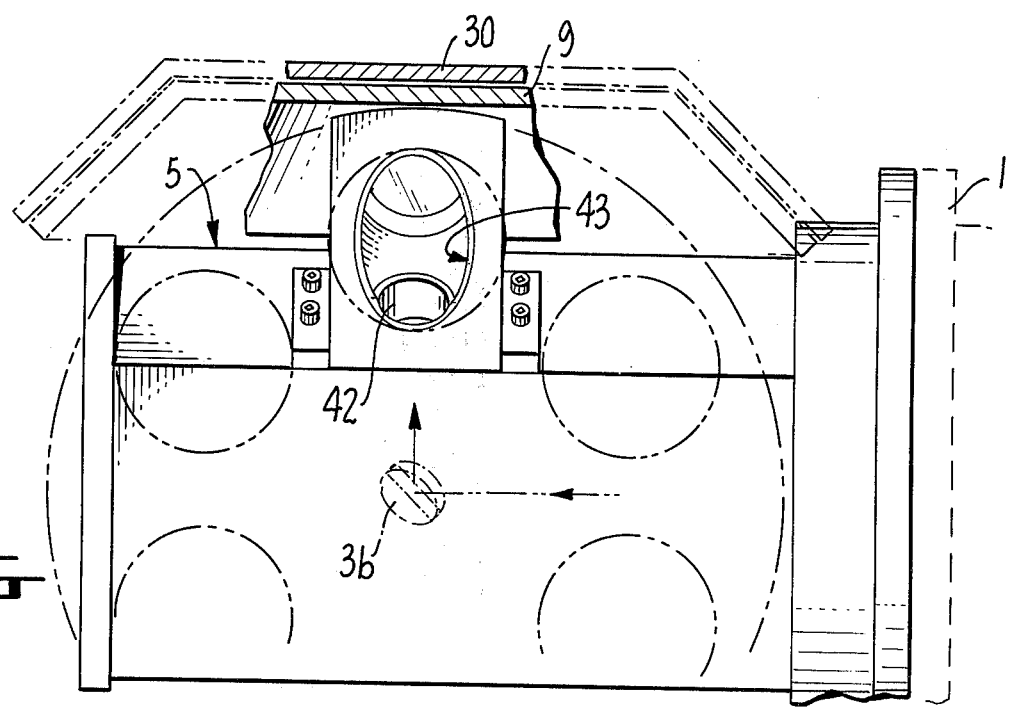

X-RAY ENERGY SPECTROMETER SYSTEM

This invention relates generally to x-ray energy spectrometers for analysis of the composition of material samples and more particularly relates to an improved apparatus for exciting such samples either with x-rays emitted directly from the primary target within an x-ray spectroscopy tube or with x-rays of selectable wavelength emitted from one of an array of turret-mounted secondary targets.

One object of this invention is to provide an x-ray energy spectrometer having an array of turret-mounted secondary targets arranged with respect to the primary target and sample to minimize solid angle losses and back-scatter.

Another object of the invention is to provide in an x-ray energy spectrometer a selectable spectrum of x-rays of nearly monochromatic wavelength to produce optimum excitation of the characteristic x-rays for the sample being analyzed and to minimize background.

Still another object of the invention is to provide in an x-ray energy spectrometer a cooperative arrangement of indexible turret-mounted samples, indexible turret-mounted secondary targets and indexible turret-mounted corresponding filters which may be easily automated and adapted to computer control of x-ray developed assay information.

One other object of the invention is to provide in an x-ray energy spectrometer an arrangement of secondary target and filter components which facilitates shielding of the sample from the primary target, minimizes the amount of back scatter and maximizes the solid angle of incident x-rays.

Other objects and advantages of the apparatus of this invention will become apparent upon consideration of the following description in connection with the accompanying drawings wherein FIG. 1 is an elevational view of the principal components of the spectrometer system partly in section;

FIG. 4 is a vertical sectional view of the secondary target turret taken along line 4—4 of FIG. 3;

FIG. 5 is a vertical sectional view of the apparatus taken along line 5—5 of FIG. 3;

It is known that x-ray fluorescence is induced in any material when it is exposed to x-ray radiation of appropriate wavelength. The intensity of the x-ray fluorescence is strongly dependent upon the wavelength of the incident x-rays upon the material. Those incident x-rays excite atoms in the material and cause them to fluoresce x-rays that are characteristic in wavelength of the elements of which the material is composed. The quantity of fluorescent x-rays plotted against wavelength produces an x-ray spectrum which is unique for each element. The complete fluorescent x-ray spectrum of an unknown substance provides a "fingerprint" for that substance which contains all the information needed to identify and quantitatively analyze most of the elements which are present in it.

The spectrum of primary x-rays generated when electrons strike a single element target has two distinct features, namely discrete lines called "characteristic x-rays" and a continuous wavelength distribution called "bremsstrahlung". The wavelength of the characteristic x-rays depends solely upon the atomic number of the element, whereas the bremsstrahlung wavelengths depend largely on the x-ray tube voltage. This invention in one mode employs the characteristic fluorescent x-rays developed by irradiating one of an array of secondary targets of dissimilar composition with x-rays produced by electron bombardment of the primary target within an x-ray spectroscopy tube. At optimum operating conditions virtually all of the bremsstrahlung spectrum from the primary target is absorbed in the secondary target. Virtually no bremsstrahlung spectrum is produced with the fluorescent x-rays of the irradiated secondary target.

The described spectrometer system employs the so-called "energy dispersive method" for analysis of the fluorescent x-ray spectrum by measuring the electric charge produced when those x-rays are absorbed in a detector. The collected charge produces a measurable voltage which is proportional to the energy of the absorbed x-rays. The energy is inversely proportional to the wavelength.

Figure 2:
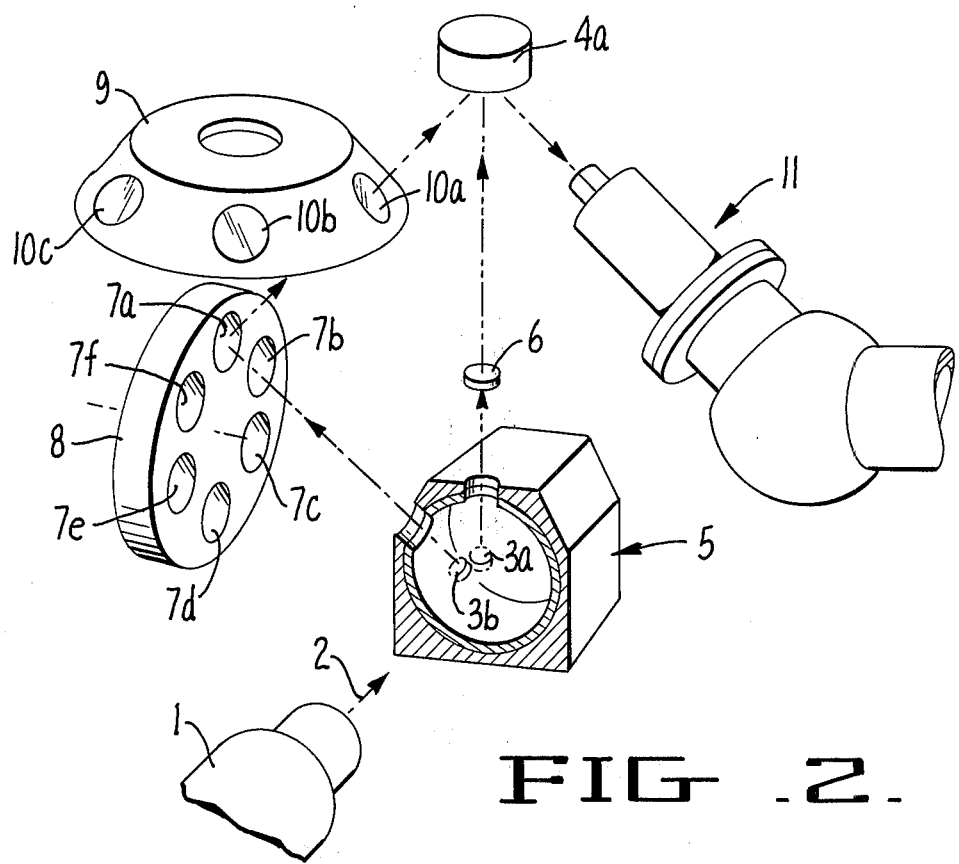
FIG. 2 is a partial perspective view of the components of the spectrometer system illustrating the alternate x-ray paths for direct and secondary target excitation of the sample.

As is shown generally in FIG. 2, the spectrometer system includes a high intensity x-ray spectroscopy tube 1 which is orientable about a horizontal axis 2 in the described embodiment to shift its internal primary target that in this embodiment is shown to be offset from such axis between a position indicated in FIG. 2 at 3a for direct excitation of sample 4a and a position at 3b for secondary target excitation of the sample 4a. Housing 5 interfaces the x-ray spectroscopy tube 1 with a fixed filter-collimator 6 which modifies the primary x-rays during one mode of operation for direct excitation of the sample.

The housing 5 interfaces the x-ray tube 1 with one of an array of secondary targets 7a through 7f carried in a first indexible turret 8 in another mode of operation. A second indexible turret 9 carries an array of filters 10a through 10f which modify the fluorescent x-rays emitted from the secondary target before they strike the sample. A collimated lithium-drifted silicon x-ray detector means referred to generally as 11 detects the quantity and characteristic wavelength of fluorescent x-rays emitted from the sample upon its excitation. The primary target positioned as at 3a or 3b in the described embodiment simply by rotation of the x-ray spectroscopy tube 1 is offset from the tube axis 2 so that in a first position, 3a, the sample may be excited in the direct mode and in a second position, 3b, may be excited by fluorescent x-rays from a secondary target.

Figure 1:
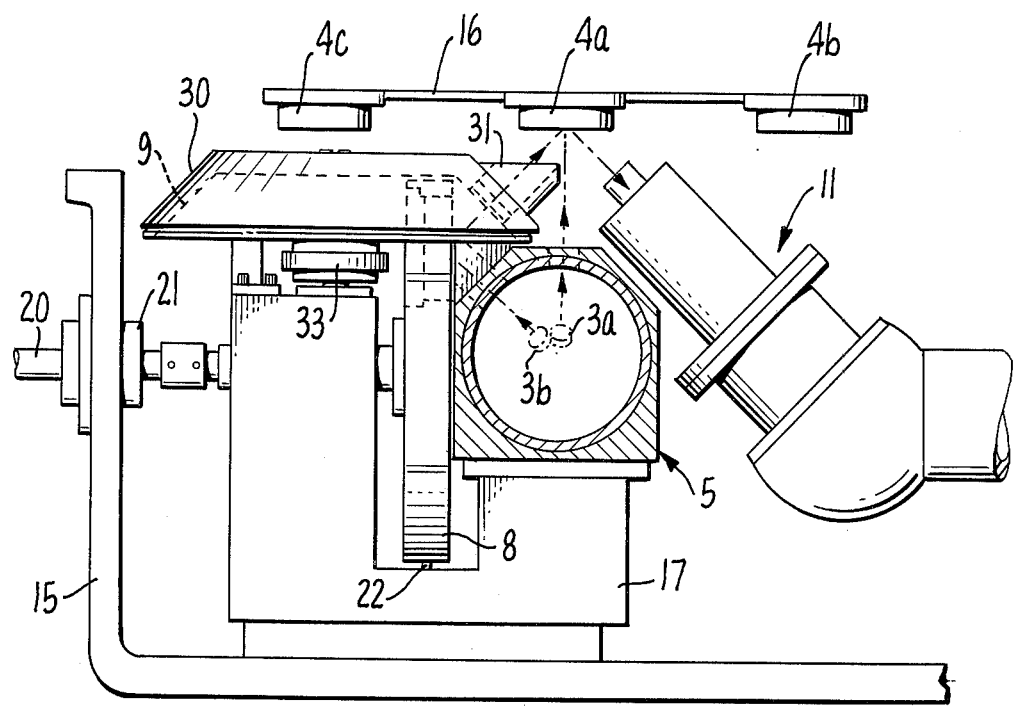

The described components mount within a sample chamber 15 shown partially in FIG. 1. The samples 4a–4c, etc. in the described embodiment are carried upon third indexible sample turret 16 which can be positioned to place any selected one of the samples in the location shown for sample 4a for irradiation and analysis. A support 17 carries the housing 5 into which an end of the x-ray spectroscopy tube 1 fits. Support 17 also carries a pair of ball bearings 18, 19 in which shaft 20 rotatably mounts the first turret means 8 that carries the secondary targets 7a–7f. As is more particularly shown in FIGS. 1 and 3, the shaft 20 passes through a seal 21 in the wall of the sample chamber 15 so that the secondary target turret can be indexed manually or automatically to locate any one of its array of secondary targets for primary x-ray excitation as is shown in the various views for secondary target 7a. A spring-biased index pin 22 fits in corresponding detents around the periphery of the first turret 8 to precisely locate the turret in its several indexed positions.

Figure 6:
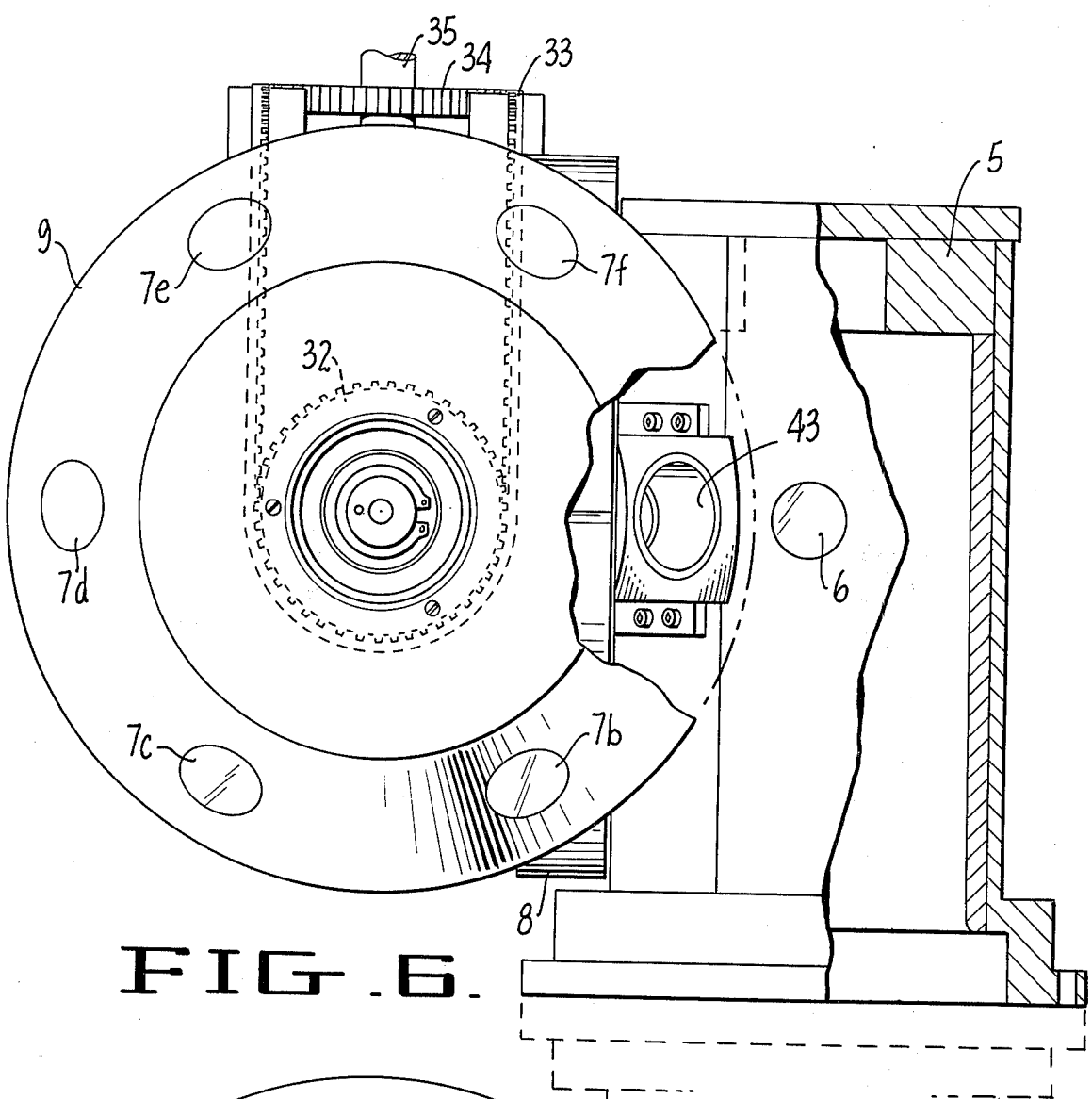
FIG. 6 is a top view of the apparatus showing the filter turret of the spectrometer system.
Figure 7:
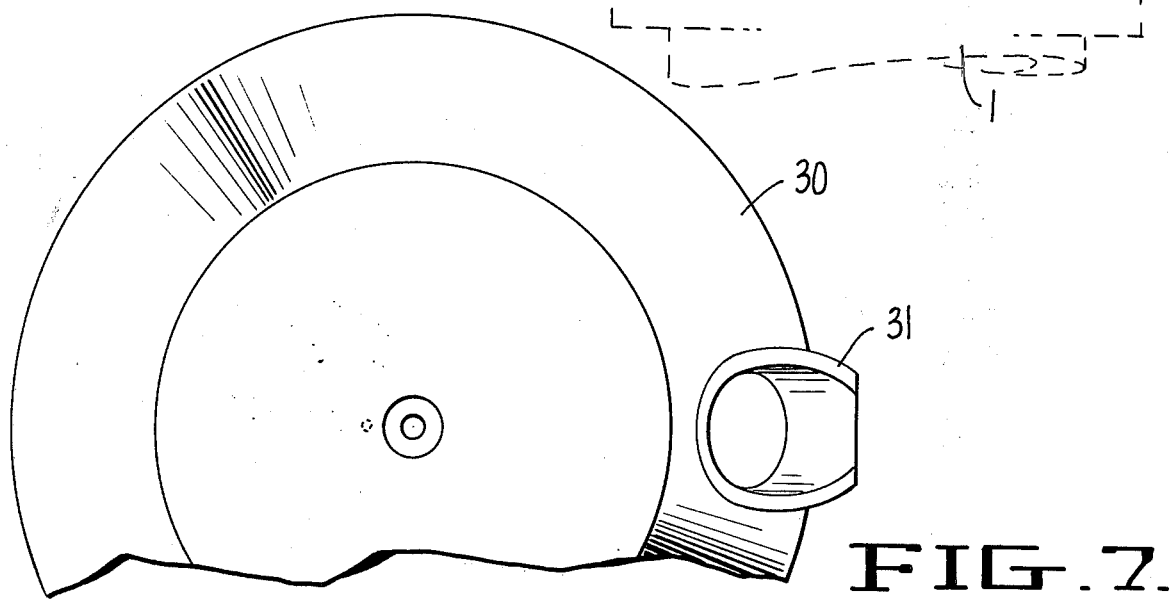
FIG. 7 is a partial top view showing the filter cover shieldcollimator cover in place.

Support 17 also carries a fixed stub axle 25 upon which the hub of the second turret 9, which carries the array of filters 10a–10f, is journaled in ball bearings 26, 27. Another spring-biased index pin 28 mates with corresponding detents in the hub of turret 9 to precisely locate one of its array of filters in the path of fluorescent x-rays passing from the secondary target, such as 7a, to the sample 4a. A fixed filter cover shield-collimator 30 mounts upon stub axle 25 and shields all filters except that directly below its collimator 31 which directs the fluorescent x-rays from the secondary target to the sample 4a as show in FIGS. 1 and 7. Drive means for the filter turret 9 are also provided in the described embodiment and include the sprocket 32 shown most clearly on FIG. 6 carried by the turret hub and a drive chain or belt 33 trained around a drive sprocket 34 shown in FIGS. 4 and 6 manipulated by drive shaft 35 either manually or automatically.

In the described embodiment, the collimator of detector means 11 is oriented upwardly at an angle of 45° with the horizontal. Sample turret 16 rotates above it about a vertical axis so that the lower faces of samples 4a, etc. are in essentially a horizontal plane. The secondary targets 7a–7f are indexible in the vertical plane of the secondary target turret 8 so that the path of fluorescent x-ray emission from the irradiated secondary target is upward to the sample at 45° from the horizontal. Back-scatter is thus minimized by the 90° angle between the path of excitation fluorescent x-rays from the secondary target which impinge upon the sample and the fluorescent x-rays emitted from the sample that pass to detector means 11.

Figure 3:
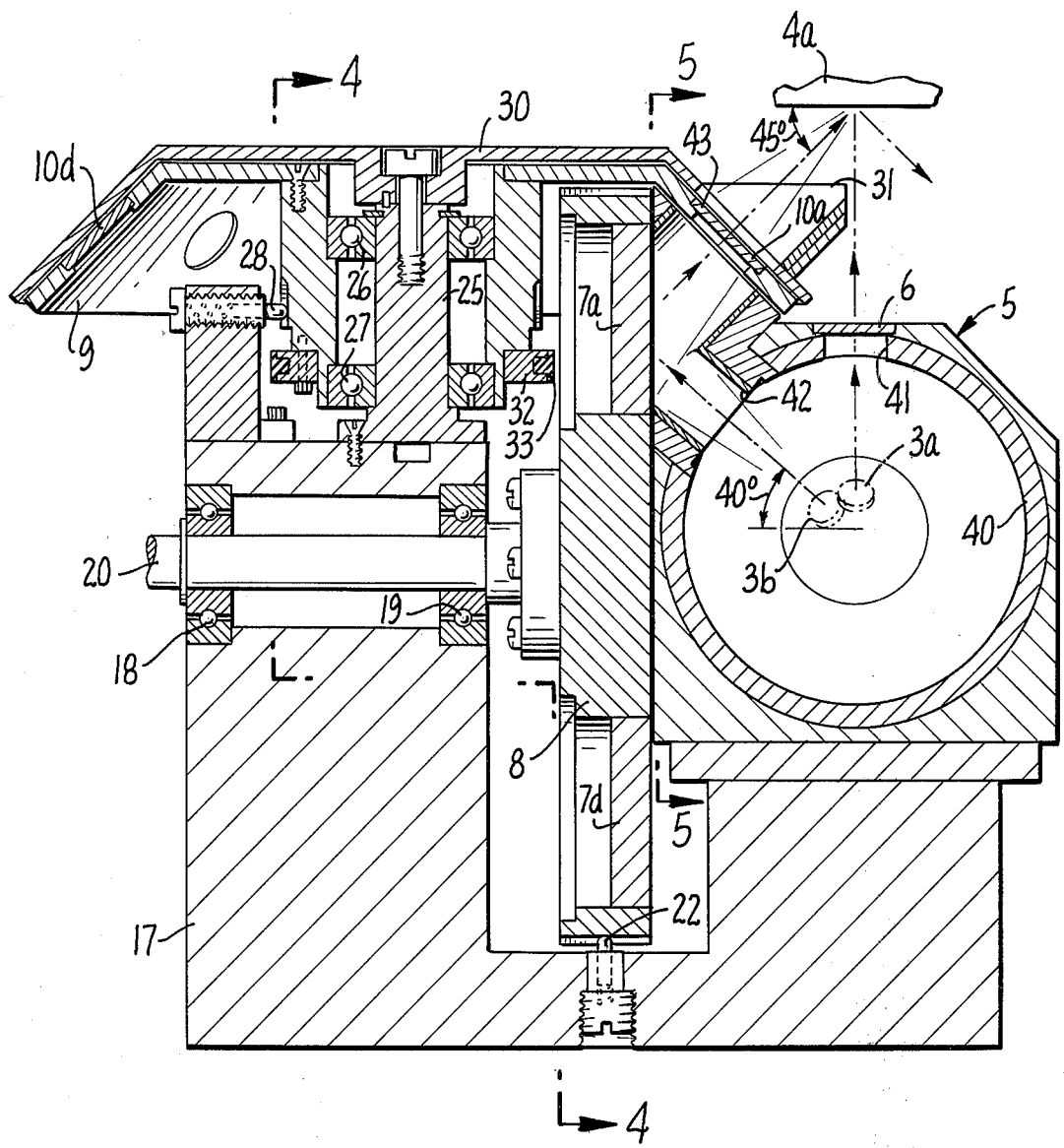
FIG. 3 is an enlarged vertical sectional view of the principal components of the spectrometer system.

The interior of the x-ray tube socket of housing 5 is sleeved as at 40 with x-ray shielding material such as brass and has one port 41 oriented vertically through which primary x-rays in one mode pass through filter-collimator 6 directly to sample 4a as shown in FIG. 3. The tube socket in housing 5 also has a second port 42 which is brass sleeved in aluminum and oriented at an angle of 40° with the horizontal in the described embodiment. Port 42 is positioned with respect to the x-ray spectroscopy tube axis so that in another mode primary x-rays from primary target at 3b strike a secondary target positioned as is 7a. The sample 4a, thus, has in its field of view only secondary target material and no other surfaces which are exposed to the primary x-rays. Only fluorescent x-rays emitted or back-scattered from the secondary target, therefore, pass through port 43 in the housing oriented back at 45° with the horizontal to the sample. Port 43 also is brass lined with aluminum and mates with collimator 31 of filter cover shield-collimator 30. The filter cover shields x-ray emissions of the sample from filters other than that immediately below the collimator 31 such as filter 10a shown in FIG. 3.

Various x-ray detectors are useful in the described spectrometer. The preferred detector means 11 includes a liquid nitrogen cooled lithium-drifted silicon detector which is collimated and radiation shielded, a detector cryostat and a preamplifier. Preamplifier output may be utilized directly or may be supplied to an amplifier, a multi-channel analyzer and various data processing or display electronics. The detector itself is housed in vacuum and receives x-rays emitted from the sample through a thin beryllium window as is well-known. The x-ray spectroscopy tube is energized by a high voltage generator operating typically up to 60,000 volts which is not illustrated. The sample chamber 15 is also provided with a cover, not shown, so that it may be fully sealed to allow analysis in vacuum or inert gas, as well as air, and is lead lined for radiation protection. The x-ray spectroscopy tube 1 and manipulative shafts 20, 35 pass through the chamber walls in gas and vacuum tight seals.

As is known, typical primary targets are tungsten or chromium. Useful secondary target materials are titanium, molybdenum, silver, barium and tin. Filter materials the same as that of the target are employed to eliminate system peaks and assure development of monochromatic fluorescent x-rays.

The described embodiments are for illustrative purposes. Various modifications will be apparent to those familiar with this art which are within the scope of the appended claims.

I claim:

1. In a spectrometer system for x-ray energy analysis of a sample, the improvement comprising
    collimated detector means deployed to detect the quantity and characteristic wavelength of fluorescent x-rays emitted from said sample upon its excitation;
    an x-ray spectroscopy tube emitting primary x-rays from an internal primary target;
    a first turret means carrying an array of secondary targets of differing composition and indexible to expose one secondary target at a time to primary x-rays emitted from the primary target, and thereby to induce fluorescent x-ray emission from said one secondary target;
    housing means shielding said sample from the primary x-rays and directing them only to said one secondary target; and
    shield-collimator means directing said fluorescent x-rays to said sample.

2. The improvement of claim 1 wherein the angle between the path of fluorescent x-rays from said sample detected by said detector means and the fluorescent x-rays from said one secondary target incident upon said sample is 90°.

3. The improvement of claim 1 wherein the sample has in its unshielded field of view only fluorescent x-rays emitted or back-scattered from said one secondary target.

4. In a spectrometer system for x-ray energy analysis of a sample, the improvement comprising
    collimated detector means deployed to detect the quantity and characteristic wavelength of fluorescent x-rays emitted from said sample upon its excitation;
    an x-ray spectroscopy tube for irradiating said sample from an internal primary target, said tube being orientable about the tube axis in a first position for direct excitation of said sample with primary x-rays and in a second position for secondary target excitation of said sample;
    a first turret means carrying an array of secondary targets of differing composition and indexible to expose one secondary target at a time to primary x-rays emitted from the primary target within said x-ray spectroscopy tube and thereby to induce fluorescent x-ray emission from said one secondary target in its second position only; and a second turret means carrying an array of filters and indexible to position one filter at a time in the fluorescent x-ray path between said one secondary target and said sample.

5. The improvement of claim 4 further comprising filter means positioned between the primary target of said x-ray spectroscopy tube and said sample.

6. The improvement of claim 4 further comprising a third turret means carrying an array of samples and indexible to expose one sample at a time to x-rays emitted from the primary target within said x-ray spectroscopy tube in its first position and from a secondary target when said tube is in its second position.

7. The improvement of claim 4 wherein the angle between the path of fluorescent x-rays from said sample detected by said detector means and the fluorescent x-rays from said one secondary target incident upon said sample is 90°.

* * * * *

UNITED STATES PATENT OFFICE
CERTIFICATE OF CORRECTION

Patent No. 3,919,548          Dated November 11, 1975

Inventor(s) David E. Porter

It is certified that error appears in the above-identified patent and that said Letters Patent are hereby corrected as shown below:

ON THE TITLE PAGE:

Between "[76] Inventor:" and "[22] Filed:", insert the following:

"Assignee: Kevex Corporation
Burlingame, California"

Signed and Sealed this second Day of March 1976

[SEAL]

*Attest:*

RUTH C. MASON
*Attesting Officer*

C. MARSHALL DANN
*Commissioner of Patents and Trademarks*

Disclaimer 3,919,548.—*David E. Porter,* Burlingame, Calif. X-RAY ENERGY SPECTROMETER SYSTEM. Patent dated Nov. 11, 1975. Disclaimer filed Oct. 10, 1982, by the assignee, *Kevex Corp.*

Hereby enters this disclaimer to claims 1, 2 and 3 of said patent.

[*Official Gazette December 21, 1982.*]

Disclaimer

3,919,548.—*David E. Porter,* Burlingame, Calif. X-RAY ENERGY SPECTROM-
ETER SYSTEM. Patent dated Nov. 11, 1975. Disclaimer filed Dec. 17,
1984, by the assignee, *Kevex Corp.*

Hereby enters this disclaimer to all claims of said patent.
[*Official Gazette February 26, 1985.*]